(12) United States Patent
Zhang et al.

(10) Patent No.: US 8,488,704 B2
(45) Date of Patent: Jul. 16, 2013

(54) METHOD FOR SELECTING SUBCHANNEL MODE AND MIMO COMMUNICATION SYSTEM USING THE SAME

(75) Inventors: Jie Zhang, Beijing (CN); Hua Zhou, Beijing (CN); Jinyin Xue, Beijing (CN)

(73) Assignee: Fujitsu Limited, Kawasaki (JP)

( * ) Notice: Subject to any disclaimer, the term of this patent is extended or adjusted under 35 U.S.C. 154(b) by 1119 days.

(21) Appl. No.: 12/370,428

(22) Filed: Feb. 12, 2009

(65) Prior Publication Data

US 2009/0238297 A1    Sep. 24, 2009

(30) Foreign Application Priority Data

Mar. 7, 2008   (CN) .......................... 2008 1 0082926

(51) Int. Cl.
*H04L 1/02*       (2006.01)
*H04B 7/02*       (2006.01)

(52) U.S. Cl.
USPC ........... 375/267; 375/295; 375/299; 375/316; 375/317; 370/334; 455/101

(58) Field of Classification Search
USPC .. 375/267, 219, 295, 316, 299, 347; 370/334; 455/101
See application file for complete search history.

(56) References Cited

U.S. PATENT DOCUMENTS

| | | | |
|---|---|---|---|
| 7,047,006 B2 | 5/2006 | Classon et al. | |
| 7,391,750 B2 | 6/2008 | Kim et al. | |
| 7,411,924 B2 | 8/2008 | Cho et al. | |
| 7,423,991 B2 | 9/2008 | Cho et al. | |
| 2006/0258303 A1 | 11/2006 | Taira et al. | |
| 2007/0129018 A1* | 6/2007 | Trainin et al. ................... 455/69 |
| 2007/0223422 A1* | 9/2007 | Kim et al. ..................... 370/334 |
| 2007/0291700 A1* | 12/2007 | Zhang et al. .................. 370/334 |

FOREIGN PATENT DOCUMENTS

| CN | 1946001 A | 4/2007 |
|---|---|---|
| WO | 2004095730 A1 | 11/2004 |

OTHER PUBLICATIONS

Draft Standard for Local and metropolitan area networks Part 16: Air Interface for Fixed Broadband Wireless Access Systems; IEEE P802.16TM (Draft Mar. 2007); pp. 1,650.
"Comparison between MU-MIMO codebook-based channel reporting techniques for LTE downlink" ; Source: Philips; Tdoc R1-062483; 3GPP TSG RAN WG1 Meeting #46bis; Seoul, South Korea, Oct. 9-13, 2006; pp. 1-10.

(Continued)

*Primary Examiner* — Ted Wang
(74) *Attorney, Agent, or Firm* — Smith, Gambrell & Russell, LLP

(57) ABSTRACT

The invention relates to Method for Selecting Subchannel Mode and MIMO Communication System Using the Same. A method for self-adaptively selecting a code modulation subchannel mode is suitably used in a MIMO communication system that comprises a base station and mobile terminals, wherein the method comprises the steps of: the mobile terminal estimating channel state information thereof, and determining a sub-channel structure most suitable for data transmission thereto, based on the channel state information; the mobile terminal feeding back information on the determined sub-channel structure most suitable for data transmission thereto to the base station; and the base station determining a sub-channel structure used for a down link, based on the information on the sub-channel structure fed back by the mobile terminal. According to the present invention, the sub-channel structure in the communication system can be self-adaptively changed according to the actual communication environment, so as to improve the entire communication quality and efficiency.

10 Claims, 2 Drawing Sheets

OTHER PUBLICATIONS

"Downlink MIMO for EUTRA"; Source: Samsung; R1-060335; 3GPP TSG RAN WG1 Meeting #44; Denver, USA Feb. 13-17, 2006; pp. 1-10.

"Precoded MIMO Concept with System Simulation Results in Macro Cells"; Source Huawei; R1-060495; 3GPP TSG RAN WG1; Denver, USA; Feb. 13-17, 2006; pp. 1-7.

"MIMO techniques for Downlink E-UTRA; Detailed description and Simulation results"; Source NEC Group; R1-060362; TSG-RAN WG1 Meeting #44, Denver, Colorado, USA Feb. 13-17, 2006; pp. 1-10.

System-level simulation results for channel vector quantisation feedback for MU-MIMO; Source: Philips; Tdoc R1-063028; 3GPP TSG RAN WG1 Meeting #47; Riga, Latvia, Nov. 6-10, 2006; pp. 1-8.

"Investigation on Precoding Scheme for MU-MIMO in E-UTRA Downlink"; Source: NTT DoCoMo; R1-072422; 3GPP TSG RAN WG1 Meeting #49, Kobe, Japan, May 7-11, 2007; pp. 1-6.

Japanese Office Action dated Jul. 11, 2012 issued in application No. 2009-054252.

Office Action for the Chinese Patent Application No. 200810082926.4 dated Mar. 29, 2012.

Japanese Office Action dated Jul. 17, 2012 issued in application No. 2009-054252.

Japanese Office Action dated Oct. 16, 2012 received in JP2009-054252.

Chinese Second Office Action dated Aug. 31, 2012 issued in application No. 200810082926.4.

Chinese Office Action dated Mar. 26, 2013 received in CN Application No. 200810082926.4.

* cited by examiner

METHOD FOR SELECTING SUBCHANNEL MODE AND MIMO COMMUNICATION SYSTEM USING THE SAME

FIELD OF THE INVENTION

The present invention relates to self-adaptively selection of a code modulation subchannel mode in a MIMO communication system.

BACKGROUND OF THE ART

In multiple-user multiple-input-multiple-output (MU-MIMO) downlink transmission, a base station (node B) is provided with M transmitting antennas, and K (K≧M) users are provided with $N_k$ receiving antennas, when channel state information at transmit side (CSIT) is available, closed loop transmission shall be adopted to increase the spectral efficiency via multiple antennas. But in narrow bandwidth applications of the feedback link, the base station cannot accurately acquire the CSIT, thus a limited feedback strategy based on quantization shall be applied in such beamforming based close-loop systems. In MIMO-OFDM systems, as the number of subcarriers in one OFDM symbol is large (usually more than 512), and the channel fading on different subcarriers are not equal to each other exactly, the amount of feedback for beamforming over all data subcarriers are enormous, which makes the close-loop transmission impossible.

One possible scheme to the above is to divide the subcarriers in time-frequency grid into several blocks, in which the same beamforming vector is applied to all the subcarriers belonging to the same block, i.e., subchannel. The possibility of this method depends on the following two factors. Firstly, the channel fading fluctuation in time-frequency grid is directly influenced by the time and frequency selective fading characteristics, and fortunately, in most of the practical applications, the fluctuation over one subchannel is very slight, therefore the channel fading over one subchannel can be regarded as approximately flat. Secondly, the common codebook at both the mobile terminal MS and the base station B is discrete as it just consists of $2^{N^b}$ precoding vectors, wherein $N^b$ is bit number for characterizing the whole codebook. Even though the channel fading on the subcarriers belonging to the same subchannel has slight fluctuation, the selected precoders may be still suitable for all the subcarriers in this subchannel.

The two points above make the block-wise precoding scheme practical in real systems with slowly time-varying fading, and each subchannel in time-frequency grid shall consist of the subcarriers with similar fading as much as possible, thus the structure of the block shall be deliberately designed. Presently, the structure of subchannel of the downlink for transmitting data from the base station B to the mobile terminal MS is fixed.

SUMMARY OF THE INVENTION

The present invention is provided in view of the above problem in the prior art, and the aim of the present invention is to self-adaptively select a subchannel structure adapted to the downlink in the MIMO communication system, according to the actual communication environment.

One aspect of the present invention provides a method for self-adaptively selecting a code modulation subchannel mode in a MIMO communication system that comprises a base station and mobile terminals, wherein the method comprises the steps of: the mobile terminal estimating channel state information thereof, and determining a subchannel structure most suitable for data transmission thereto, based on the channel state information; the mobile terminal feeding back information on the determined subchannel structure most suitable for data transmission thereto to the base station; and the base station determining a subchannel structure used for a down link, based on the information on the subchannel structure fed back by the mobile terminal.

Preferably, in the above method, the mobile terminal determines the subchannel structure most suitable for data transmission thereto, based on any one of the following a) to d): a) to make the fading on the determined subchannel as flat as possible; b) to make the effective signal-to-interference-noise ratio (ESINR) in one subchannel as high as possible; c) to make the average physical signal plus interference-to-noise ratio (SINR) on the determined subchannel as high as possible; and d) to balance among a), b) and c).

Preferably, in the above method, the mobile terminal feeds back index of the determined subchannel structure, precoding vectors selected based on the subchannel structure, and calculated value of channel quality indicator, to the base station.

Preferably, in the above method, the base station determines a subchannel structure used for a down link, according to service requirement, service quality, power limitation, delay requirement or in a way of maximizing the throughput, based on the subchannel structure fed back by the mobile terminal.

In the above method, if there are a plurality of the mobile terminals, the base station determines the subchannel structure used for the down link, according to priorities of the mobile terminals or in a way of maximizing the total throughput, based on the subchannel structures fed back by the mobile terminals.

In the above method, if one mobile terminal is mandatory transmitting terminal, the base station selects a subchannel structure fed back by said one mobile terminal as the channel structure used for the down link.

Another aspect of the present invention further provides a MIMO communication system wherein the method for self-adaptively selecting a code modulation subchannel mode is applied.

According to the present invention, the subchannel structure in the communication system can be self-adaptively changed according to the actual communication environment, so as to improve the entire communication quality and efficiency.

DETAILED DESCRIPTION OF THE PREFERRED EMBODIMENTS

In the present invention, three criteria for block design are adopted so that the total throughput of the base station B is approximately maximized. The first criterion is to minimize channel fluctuation, the second one is to maximize effective SINR, and the third one is to maximize precoding output power of a subchannel. The three criteria are all performed at the mobile terminal MS side. Moreover, the subchannel structure is selected at the base station B to meet the priority requirement between different users, or maximize the throughput.

Multiple user transmission in MIMO downlink can boost the system throughput as well as improve quality-of-service (QoS). The CSIT acquirement is not an easy task for downlink beamforming in closed loop transmission. Codebook based feedback is an effective approach to overcome the inaccuracy in the CSIT while possessing favorable performances. If the precoding vector index feedback is based upon subcarrier, the amount of feedback overhead is tremendous, which makes an uplink channel feedback impossible. The block-wise precoding and feedback strategy is commonly adopted in real systems. Although the channel fading in one subchannel is not exactly the same, the structures of subchannels under different channel environments shall be easy to be investigated.

Different users suffer from different channel fading, and this makes the subchannel structures between them inconsistent with each other. The selection of the subchannel structure at the base station B shall also be designed to support the MU-MIMO transmission in high spectrum efficiency systems.

System Model

In downlink MU-MIMO systems, the base station B deploys M transmitting antennas, there are total K users waiting for communication with the base station B simultaneously at the same frequency band. Herein K>1 corresponds to space-division multiple access (SDMA) transmission, and K=1 corresponds to SU-MIMO system. The diagram of such communication system is shown in FIG. 1.

Figure 1:
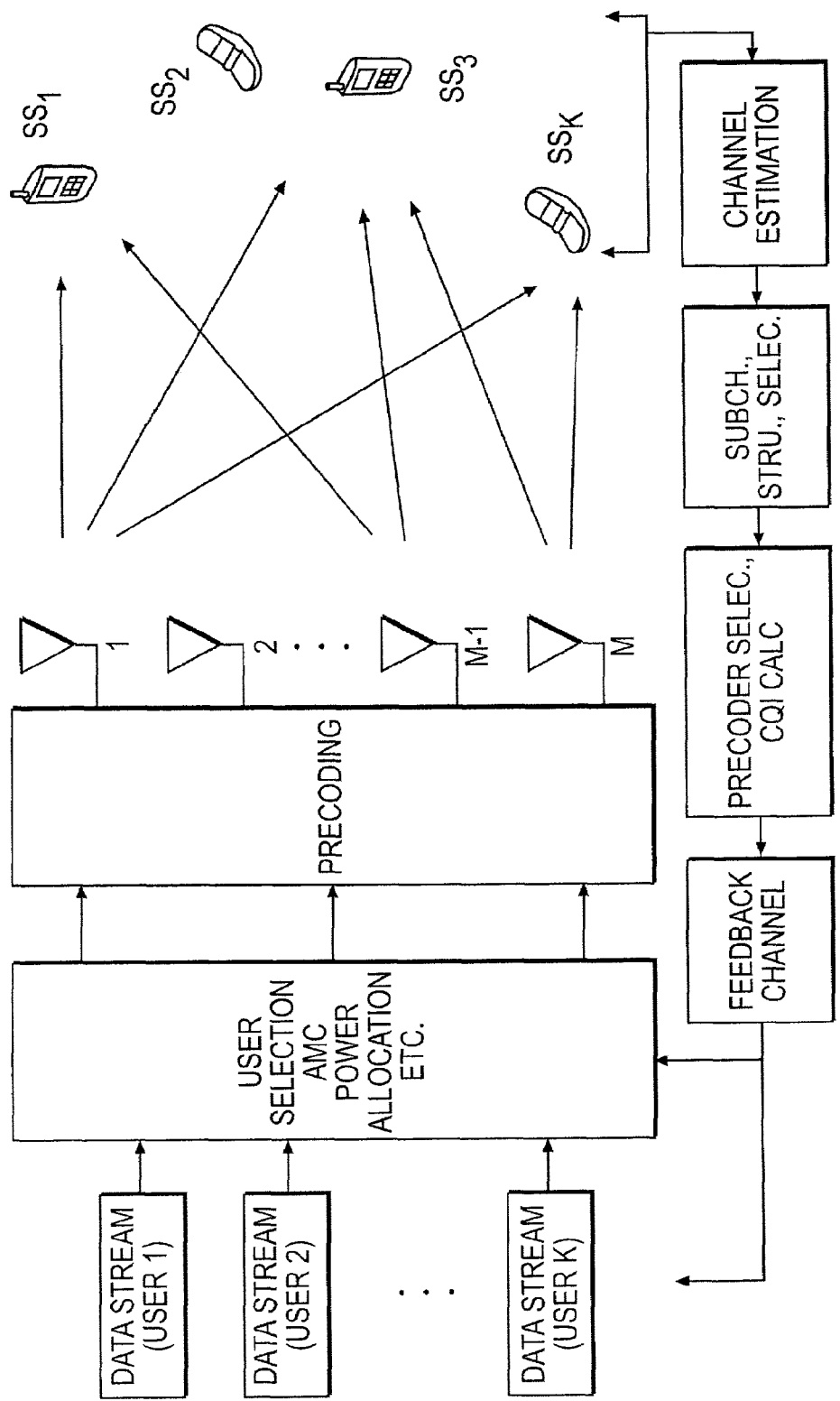
FIG. 1 schematically shows a MIMO communication system of the present invention.

In FIG. 1, each terminal estimates its own channel state information (CSI) respectively. According to the estimated CSI, the terminals determine their respective subchannel structures most suitable for data transmission thereto. The criteria used here can be such that the channel fading is fat on the predetermined subchannel as much as possible, or that the effective SINR of the subchannel is maximized. Based on the predetermined subchannel structure, each user selects the best precoding vector in the $N^b$-bit codebook according to maximization of the receiving SNR, and calculates the channel quality indicator (CQI) value. After this procedure, the terminals feed back their respective subchannel structure indices, selected precoder indices and CQI values to the base station B. The base station B jointly determines the only subchannel structure for all selected J users' downlink transmissions. The criteria used herein can be maximizing sum capacity, proportional fairness and QoS guarantee etc. The parameter J shall satisfy $$\sum_{j=1}^{J} K_j \leq M$$

so as to avoid multi-user interference as much as possible. Furthermore, the base station B selects suitable modulation coding style (MCS) for each terminal according to QoS requirement. In some advanced applications, power allocation between different users is used to further improve the spectral efficiency. The precoding module applies different precoding weight to transmit data streams for different users.

The focus of the invention is to determine the subchannel structure, i.e., select a most suitable structure from a set containing several possibilities.

Feedback at the Mobile Terminal Side

Assuming the codebook set known to both the base station B and each terminal is denoted by $$S = [c_0, c_1, \ldots c_{2^{N^b}}],$$

and the channel state information from the base station to user k is denoted by $H_k \in C^{M \times K_k}$ whose element is unit covariance complex Gaussian distribution in zero mean. In applications, we assume that each user can estimate its channel state information $H_k$ accurately. For convenience, we assume that the noise powers at all terminals are the same, say $\sigma_n^2$. Then the user k selects the best codebook vector according to the following maximizing SNR criteria.

$$w_k = \arg\max_{c_l \in S} (\|H_k^H c_l\|_2^2) \qquad (1)$$

The by-product CQI value is obtained from $$CQI_k = \|H_k^H w_k\|_2^2 \qquad (2)$$

As the codebook set S is common to the base station B and all the mobile terminals, the K mobile terminals feed back respective precoding codebook index (PVI) of selected vector from S to the base station B via the dedicated feedback uplink channel.

Subchannel Structure Selection

For OFDMA systems, the resource in time-frequency grid is divided into many rectangular subchannels, and the average channel coefficient over one subchannel between the $m_t^{th}$ transmitting antenna of the base station B and the $m_r^{th}$ receiving antenna of the user k is computed as follows:

$$\overline{H}_{m_t,m_r} = \sum_{t=1}^{S_t} \sum_{f=1}^{S_f} H_{m_t,m_r}^{t,f} \qquad (3)$$

wherein $H_{m_t,m_r}^{t,f}$ is the channel fading of the $f^{th}$ subcarrier and $t^{th}$ OFDMA symbol between the $m_t^{th}$ transmitting antenna of the base station B and the $m_r^{th}$ receiving antenna of the user k; $S_t \cdot S_f = S$ is the total number of subcarriers in one subchannel. Here the uplink feedback is based upon subchannel such that the total amount of feedback is dramatically decreased, wherein $S \cdot N^b$ bits are required for feedback per subcarrier whereas $N^b$ bits for feedback per subchannel. One subchannel occupies several subcarriers in frequency domain and several OFDMA symbols in time domain, and the number of subcarriers and symbols in one subchannel with fixed number of total subcarriers shall be well designed to maximize the system performances.

Figure 2A:
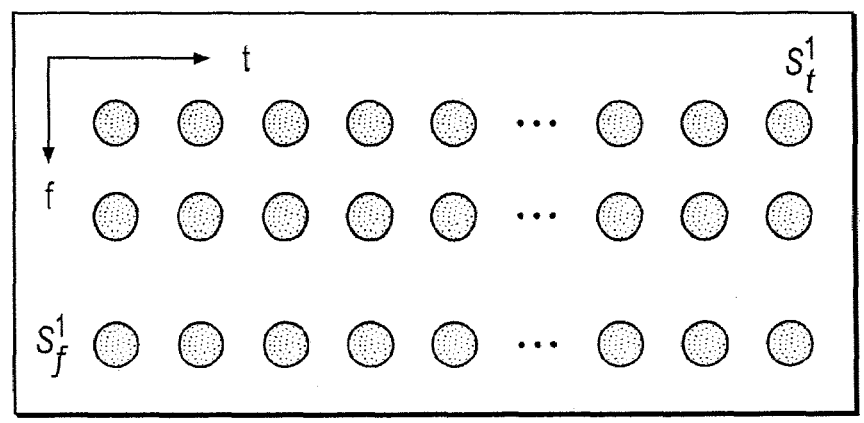
FIGS. 2A and 2B show two examples of the subchannel structure.
Figure 2B:
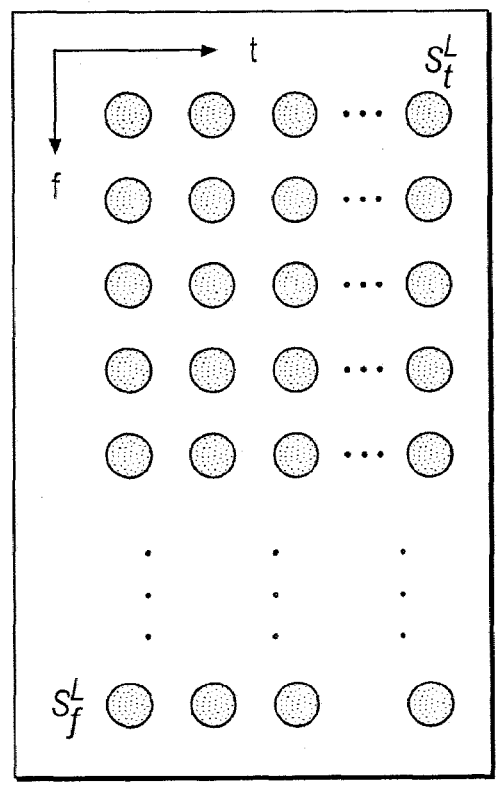

Here the subchannel structure shall be selected based on the channel characteristics. FIGS. 2A and 2B depict two examples of subchannel structure. FIG. 2A spans more OFDMA symbols in time domain, whereas less subcarriers in frequency domain. As the subchannel in time-frequency grid is rectangular, the total number of subcarriers in a subchannel can be decomposed by the product of several pairs of integers. Assuming S has L possible decompositions as follows, $$S = S_t^1 \cdot S_f^1 = S_t^2 \cdot S_f^2 = \ldots = S_t^L \cdot S_f^L \qquad (4)$$

Method 1

The first criterion of selecting subchannel structure is to make the channel fading over a subchannel as flat as possible.

The following minimum correlated covariance for all possible decompositions in Eq. (4) is adopted in this invention, i.e., $$(S_t^{opt} \cdot S_f^{opt}) = \arg\min_{(s_t^l, s_t^f)} \frac{\sum_{m_{rt}=1}^{M_T} \sum_{m_r}^{M_R} \sum_{t=1}^{S_t^l} \sum_{f=1}^{S_f^l} \left( |H_{m_t,m_r}^{t,f}|^2 - \frac{1}{S} \sum_{t=1}^{S_t^l} \sum_{f=1}^{S_f^l} |H_{m_t,m_r}^{t,f}|^2 \right)^2}{\sum_{m_{rt}=1}^{M_T} \sum_{m_r}^{M_R} \sum_{t=1}^{S_t^l} \sum_{f=1}^{S_f^l} |H_{m_t,m_r}^{t,f}|^4} \quad (5)$$

Method 2

The second criterion is to maximize the effective SINR (ESINR) over a subchannel. For all channel fading values of a specific subchannel structure, the SINR of the subchannel is calculated by adopting the mapping method from link level to system level. In the present invention, the following common mapping method from link level to system level is adopted:

$$ESINR^l = F(H_{1,1}{}^{1,1}, H_{1,1}{}^{1,2}, \ldots, H_{1,1}{}^{S_t^l, S_f^l}) \quad (6)$$

wherein F is the adopted mapping method from link level to system level; in practical system design, methods such as EESM, MMIB or RBIR can be used. Eq. (6) describes the calculation method of ESINR with respect to SISO condition, and in case of MIMO condition, the calculation of ESINR depends on the adopted MIMO transmission technology. Then the subchannel structure maximizing ESINR is obtained via Eq. (6).

$$(S_t^{opt} \cdot S_f^{opt}) = \arg\max_{(s_t^l, s_t^f)} ESINR^l \quad (7)$$

Method 3

The third criterion is to maximize the average physical SNR over a subchannel. For all the alternatives of subchannel structures, we shall select the corresponding precoders based on the average channel coefficient, and find out the subchannel structure having the maximum average SNR. For a specific subchannel structure $(S_t^l, S_f^l)$, the precoder is determined based upon the following average channel, $$\overline{H}_{m_t,m_r}^l = \sum_{t=1}^{S_t^l} \sum_{f=1}^{S_f^l} H_{m_t,m_r}^{t,f} \quad (8)$$

Then, the precoding vector index is obtained from $$w_l^k = \arg\max_{c_l \in C}(\|\overline{H}_l^H c_l\|_2^2) \quad (9)$$

The real average SNR of the current subchannel based on $(S_t^l, S_f^l)$ is $$\overline{SNR}_k^l = \|\overline{H}_l^H w_l^k\|_2^2 \quad (10)$$

Therefore, the subchannel structure is determined by finding maximum of the following optimization problem, $$(S_t^{opt} \cdot S_f^{opt}) = \arg\max_{(s_t^l, s_t^f)} \overline{SNR}_k^l \quad (11)$$

After each user determining the best subchannel mode, the corresponding PVI for precoding and CQI, all these information is fed back to the base station B.

Processing at the Base Station B

Assuming the feedback channel is error-free and zero feedback delay. The base station B demodulates the information on precoding vector indices and CQIs and individual subchannel structure from all users, then determines the subchannel mode to be used actually, active user set, i.e., the set contains the user indices which are allowed for downlink data transmission.

For all the subchannel modes fed back from individual user, the base station B selects the real subchannel structure according to user priority and the maximum number of the same subchannel mode, i.e., if a user with subchannel mode A is mandatory user for transmission, the base station B selects the subchannel mod A as the subchannel structure. Otherwise, the base station B selects the one required by most users as the subchannel structure. In case of a single user, the subchannel structure is determined according to the feedback information of the user of interest, and the beamforming vector is the precoder indexed by PVI.

In case of multiple users, selection of effective users and beamforming can be based on greedy algorithm.

Although the present invention is only illustrated with the preferred embodiments, persons skilled in the art can easily make various changes and modifications without going beyond the scope of the invention defined by the claims, on the basis of the contents disclosed herein. The description of the above embodiments is just exemplary, and does not intend to limit the invention defined by the claims and the equivalents.

All contents of the following references are incorporated into the Description of the application by reference, as described in details herein.

[1] Part 16: Air Interface for Fixed Broadband Wireless Access Systems, IEEE P802.16 (Draft March 2007), Revision of IEEE Std 802.16-2004, as amended by IEEE Std 802.16f-2005 and IEEE 802.16e-2005

[2] 3GPP R1-072422, NTT DoCoMo, "Investigation on precoding scheme for MU-MIMO in E-UTRA downlink"

[3] 3GPP R1-060335, Samsung, "Downlink MIMO for EUTRA"

[4] 3GPP R1-060495, Huawei, "Precoded MIMO concept with system simulation results in macrocells"

[5] 3GPP R1-062483, Philips, "Comparison between MU-MIMO codebook-based channel reporting techniques for LTE downlink"

[6] 3GPP R1-060362, NES Group, "MIMO techniques for downlink E-UTRA: detailed description and simulation results"

[7] IEEE 802.16m-07/037r2, "Draft IEEE 802.16m Evaluation Methodology"

[8] 3GPP R1-063028, Phillips, "System-level simulation results for channel vector quantization feedback for MU-MIMO"

What is claimed is:

1. A method for self-adaptively selecting a code modulation sub-channel mode in a MIMO communication system that comprises a base station and mobile terminals, wherein the method comprises the steps of:
   the mobile terminal estimating channel state information thereof, and determining a sub-channel structure most suitable for data transmission thereto, based on the channel state information;
   the mobile terminal feeding back information on the determined sub-channel structure most suitable for data transmission thereto to the base station; and
   the base station determining a sub-channel structure used for a down link, based on the information on the sub-channel structure fed back by the mobile terminal,
   wherein the mobile terminal determines the sub-channel structure most suitable for data transmission thereto, based on any one of the following a) to d):
   a) to make the fading on the determined sub-channel as flat as possible;
   b) to make the effective SINR in one sub-channel as high as possible;
   c) to make the average physical SNR on the determined sub-channel as high as possible;
   d) to balance among a), b) and c).

2. The method according to claim 1, wherein the mobile terminal feeds back index of the determined sub-channel structure, pre-coding vectors selected based on the sub-channel structure, and calculated value of channel quality indicator, to the base station.

3. The method according to claim 1, wherein the base station determines a sub-channel structure used for a down link, according to service requirement, service quality, power limitation, delay requirement or in a way of maximizing the throughput, based on the sub-channel structure fed back by the mobile terminal.

4. The method according to claim 1, wherein if there are a plurality of the mobile terminals, the base station determines the sub-channel structure used for the down link, according to priorities of the mobile terminals or in a way of maximizing the total throughput, based on the sub-channel structures fed back by the mobile terminals.

5. The method according to claim 4, wherein if one mobile terminal of the plurality of the mobile terminals is mandatory transmitting terminal, the base station selects a sub-channel structure fed back by said one mobile terminal as the channel structure used for the down link.

6. An MIMO communication system for self-adaptively selecting a code modulation sub-channel mode, comprising a base station and mobile terminals,
   wherein the mobile terminal is configured to estimate channel state information thereof, determine a sub-channel structure most suitable for data transmission thereto based on the channel state information and feed back information on the determined sub-channel structure most suitable for data transmission thereto to the base station,
   and wherein the base station is configured to determine a sub-channel structure used for a down link based on the information on the sub-channel structure fed back by the mobile terminal,
   and wherein the mobile terminal is further configured to determine the sub-channel structure most suitable for data transmission thereto based on any one of the following a) to d):
   a) to make the fading on the determined sub-channel as flat as possible;
   b) to make the effective SINR in one sub-channel as high as possible;
   c) to make the average physical SNR on the determined sub-channel as high as possible;
   d) to balance among a), b) and c).

7. The MIMO communication system according to claim 6, wherein the mobile terminal is further configured to feed back index of the determined sub-channel structure, pre-coding vectors selected based on the sub-channel structure, and calculated value of channel quality indicator, to the base station.

8. The MIMO communication system according to claim 6, wherein the base station is further configured to determine a sub-channel structure used for a down link, according to service requirement, service quality, power limitation, delay requirement or in a way of maximizing the throughput, based on the sub-channel structure fed back by the mobile terminal.

9. The MIMO communication system according to claim 6, wherein if there are a plurality of the mobile terminals, the base station is further configured to determine the sub-channel structure used for the down link, according to priorities of the mobile terminals or in a way of maximizing the total throughput, based on the sub-channel structures fed back by the mobile terminals.

10. The MIMO communication system according to claim 9, wherein if one mobile terminal of the plurality of the mobile terminals is mandatory transmitting terminal, the base station is further configured to select a sub-channel structure fed back by said one mobile terminal as the channel structure used for the down link.

* * * * *